United States Patent
Sjoberg et al.

(10) Patent No.: US 7,060,158 B2
(45) Date of Patent: Jun. 13, 2006

(54) PROCESS FOR THE MANUFACTURE OF A DECORATIVE LAMINATE

(75) Inventors: Ake Sjoberg, Lund (SE); Fredrik Fackler, Lund (SE); Hans Persson, Perstorp (SE); Tomas Stjernberg, Perstorp (SE); Patricio Villarroel, Perstorp (SE); Roger Johansson, Perstorp (SE); Anders Karlsson, Skanor (SE)

(73) Assignee: Pergo (Europe) AB, Trelleborg (SE)

( * ) Notice: Subject to any disclaimer, the term of this patent is extended or adjusted under 35 U.S.C. 154(b) by 223 days.

(21) Appl. No.: 10/400,061

(22) Filed: Mar. 27, 2003

(65) Prior Publication Data

US 2003/0183334 A1    Oct. 2, 2003

(30) Foreign Application Priority Data

Mar. 27, 2002 (SE) .................................. 0200945

(51) Int. Cl.
*B32B 37/00* (2006.01)
(52) U.S. Cl. .................................. 156/307.7; 156/269
(58) Field of Classification Search ................ 156/229, 156/269, 306.9, 307.3, 307.4, 307.7, 309.6
See application file for complete search history.

(56) References Cited

U.S. PATENT DOCUMENTS

| | | | |
|---|---|---|---|
| 4,599,124 A * | 7/1986 | Kelly et al. .................... 156/71 |
| 5,062,340 A | 11/1991 | Greven | |
| 5,695,875 A * | 12/1997 | Larsson et al. ............. 428/326 |
| 5,744,220 A * | 4/1998 | Ringo ...................... 428/195.1 |
| 5,780,147 A * | 7/1998 | Sugahara et al. ........... 428/332 |
| 6,042,761 A * | 3/2000 | Melzer et al. ............. 264/40.1 |
| 6,568,148 B1 * | 5/2003 | Eisermann ................. 52/783.1 |

FOREIGN PATENT DOCUMENTS

| | | | |
|---|---|---|---|
| GB | 1283526 A | * | 7/1972 |
| WO | 9731776 | | 9/1997 |

OTHER PUBLICATIONS

WO 97/31775 Sep. 1997 Giertz et al.*
WO 99/09274 Feb. 1999 Eisermann.*
WO 99/12736 Mar. 1999 Sjolin et al.*

* cited by examiner

*Primary Examiner*—Jeff H. Aftergut
*Assistant Examiner*—John L. Goff
(74) *Attorney, Agent, or Firm*—Stevens, Davis, Miller & Mosher, L.L.P.

(57) ABSTRACT

A process for the manufacture of a decorative boards, which boards includes a decorative layer, wherein a decor sheet is placed as a surface layer on a base layer and bonded thereto by pressing under elevated temperature and pressure. The decor sheet is cut to a predetermined format from a web, the cut being arranged on a fixed position related to possible repetition frequency of a decor pattern of the web. The decor sheet is then accurately placed on a base layer with a predetermined format. The decor sheet is spot welded to the base layer. A number of such base layers with attached decor sheets are then, one after the other, fed in between the belts of a continuous laminate press, optionally together with an uppermost wear layer. The base layers, the decor sheets and possibly the optional wear layer is then laminated together under heat and pressure in the laminate press.

35 Claims, No Drawings

PROCESS FOR THE MANUFACTURE OF A DECORATIVE LAMINATE

BACKGROUND OF THE INVENTION

1. Field of the Invention

The present invention relates to a process for the manufacture of a decorative thermosetting laminate by means of a continuous laminate press.

2. Description of Prior Art

Products coated with thermosetting laminates are frequent today. They are foremost used where the demand for abrasion resistance is high, but also where resistance towards different chemicals and moisture is required. As an example of such products floors, floor beadings, table tops, work tops and wall panels can be mentioned.

The thermosetting laminate most often consists of a carrying base with a decor sheet and one or more wear layers placed closest to the surface. The decor sheet can be provided with a desired decor or pattern. The most frequent patterns usually represent the image of different kinds of wood, or minerals such as marble or granite. The surface of the laminate can be provided with a structure during the laminating procedure which will make the decor more realistic. The most common way of achieving such a laminate is by first manufacturing the thermosetting laminate of a number of paper layers impregnated with melamine formaldehyde resin and then to glue this thermosetting laminate onto a core of for example fibre board or particle board. It is also known to feed a few melamine formaldehyde impregnated paper webs together with sheets of particle or fibre board through a continuous laminate press. The problem is, in the first case, that the thermosetting laminate will change format somewhat which will cause problems when the decor is patterned in a way that calls for accurate matching. The same problem occurs in the continuous process where it will be virtually impossible to have accurate matching longitudinally due to the fact that particle boards and fibre boards come in limited lengths. It is very difficult to accurately match a repetition frequency of a decor pattern of a web to boards without causing loss of material.

SUMMARY OF THE INVENTION

Accordingly to the present invention the above mentioned problems have been solved and a continuous process for manufacturing a laminate has been achieved. Accordingly the present invention relates to the process of manufacturing of decorative boards, which boards includes a decorative layer. A decor sheet is hereby placed as a surface layer on a base layer and bonded thereto by pressing under elevated temperature and pressure. Decor sheets are cut to a predetermined format from a web, the cut being arranged on a fixed position related to possible repetition frequency of a decor pattern of the web. The decor sheet is then accurately placed on a base layer with a predetermined format whereupon the decor sheet is fixed to the base layer. The base layer may be constituted by either a web or a sheet. This may for example be achieved by spot welding it, gluing it or to attaching it by means of electrostatic attraction or friction to the base layer. A number of such base layers with attached decor sheets are then, one after the other, fed in between the belts of a continuous laminate press, optionally together with an uppermost wear layer. The base layers, the decor sheets and possibly the optional wear layer is thereby laminated together under heat and pressure in the laminate press.

The base layer is suitably constituted of a particle board, a medium density fibre board or a high density fibre board having a thickness in the range 3–20 mm.

According to one embodiment of the invention the base layer further comprises a base paper sheet of Kraft paper impregnated with phenol formaldehyde resin, the base paper sheet being arranged between the particle board or fibre board and the decor sheet. The phenol formaldehyde resin is advantageously of an alkaline catalysed type while the decor paper and possible wear layer papers are impregnated with acidic catalysed melamine formaldehyde resin. The dimension stability will be easier to control due to less shrinkage during lamination by utilising this combination of layers whereby problems like warping can be avoided. The impact resistance will also be improved by the above combination.

According to a preferred embodiment of the invention the decorative boards further comprises a wear layer which is constituted by at least one web of cellulose impregnated with melamine formaldehyde resin and which is strewed with small aluminium oxide particles. The small hard particles may for example be incorporated in the pulp during manufacturing of the cellulose web, sprinkled on the wet lacquer during the impregnation procedure or incorporated in the lacquer used for impregnation. The wear layer web is continuously fed from a roll in between the belts of the continuous laminate press together with the base layer sheets and decor sheets. The decor sheet is suitably constituted of cellulose impregnated with melamine formaldehyde resin.

According to one embodiment of the invention a lowermost backing layer is continuously fed from a roll in between the belts of the continuous laminate press together with the base layer sheets and decor sheets. The decor sheet is suitably stretched to compensate for shrinking during the lamination procedure. The decor sheet may suitably be provided with positioning means, said positioning means being placed in a predetermined relation to the direction variations of the decor pattern.

The base layer is suitably preconditioned to a predetermined moisture content and temperature prior to being provided with a decor sheet.

The decor sheet is suitably also preconditioned to a predetermined moisture content and temperature prior to being applied on the base layer.

The wear layer web is suitably also preconditioned to a predetermined moisture content and temperature prior to being applied on the decor sheet.

Also the structure web is suitably preconditioned prior to use. It may be pre-shrunk prior to first use. It may also be preconditioned to a predetermined moisture content and temperature before being used in the lamination process.

According to one embodiment of the invention at least one balance layer is applied on the lower side of the base layer. The balance layer web is suitably preconditioned to a predetermined moisture content and temperature prior to being applied on the base layer.

The decorative layer is suitably provided with a surface structure. This is suitably achieved by means of known techniques such as an embossed web fed between the belts as an uppermost layer of the laminate. The web is separated from the web after the lamination procedure. It is also possible to utilise a structured press belt as an alternative to the structured web.

According to an alternative embodiment of the invention the decorative layer is provided with a surface structure after the lamination procedure. The surface structure is hereby achieved by means of at least one structured embossing roller. The temperature of the decorative boards is preferably higher than 50° C. during the structuring procedure in order to avoid micro-cracking of the laminate surface.

The decor is suitably provided with positioning means selected from the group consisting of colour dots, holes, code lines and indentations. Said positioning means are placed in a predetermined relation to the decor of the decor sheets. These positioning means are used for guiding the positioning of the at least one structured embossing roller.

DESCRIPTION OF THE PREFERRED EMBODIMENTS

According to one embodiment of the invention the lamination takes place in the continuous laminate press where a structure foil is continuously fed through the press. The decor and structure web is provided with positioning means selected from the group consisting of colour dots, holes, code lines, gloss grade differences, protrusions and indentations. By use of so called vision systems comprising ccd cameras it is possible to identify certain features of the decor and structure and use these as positioning means. Said positioning means are placed in a predetermined relation to the decor of the decor sheets. The velocity of the structure foil is preferably continuously guided by means of sensors and the positioning means so that an accurate match between the decor and surface structure is obtained. The sensors may be selected from the group consisting of; mechanical transmitters, scanners, photocells, ccd cameras and pneumatic sensors.

This is advantageously achieved by arranging a decor sheet on a base layer so that a predetermined beginning and end of the decor is arranged on a predetermined position of the base layer where the base layer is a panel and the decor sheet is arranged in a predetermined position to the four edges. A structure web having a structure with characteristic patterns matching characteristic decor features of the decor sheets is continuously feed through a laminate belt press. An identification system identifies positioning means of the structure web which identification system via processing guides the feeding of the panels with decor sheets in to the laminate belt press so that a desired match between the decor sheet and the structure web is achieved. A secondary identification system is located after the laminate belt press for detecting the matching between the decor features and the structure features. The measuring result is used as a parameter in the processing for guiding the feeding of the panels with decor sheets. It is also possible to add further layers within the process. Such layer may be one or more so-called overlays which are added in the form of a web or a number of webs located between the decor and the structure web. It is also possible to add one or more base paper sheets beneath the decor sheet.

In a special embodiment of the invention also the base paper is a continues web. In this case the decor sheet is arranged on the base paper web in a position so that a match between the characteristic structure patterns and the characteristic decor features will be achieved during lamination. Again, the post-analysis of the achieved matching is feed into the processing which guides the feeding of the decor sheets.

Since the repetition length of the characteristic structure patterns of the structure web in fact is the determining factor it becomes necessary to use a matching zone on this web or to have the length of the decor sheets slightly shorter than this repetition length. In the case where a continuous base paper web is used as a base for the decor this will cause no problem. However, when panels are used as a base or included in the base, some adjustments to the process is desirable. It is highly advantageous to have such panels arranged edge to edge, closely together during the press cycle. This will of course lead to a matching problem as the repetition length of the structure web and the repetition length of the panels need to match over time. This is suitably achieved by using two or more sets of panels with different repetition length. A first set of panels is then slightly longer than the repetition length of the structure web while a second set is slightly shorter than the repetition length of the structure web. The first or second type of panels are then selected through means of the process parameters and edge identification means to achieve a desired match between panel edge and structure web. It is also possible to use further sizes of panels where one size would be a nominal length which would be seen as an attempt at matching the repetition length of the structure web. Shorter and longer panels will then be used occasionally to adjust any drift in matching between edge and structure. It alternatively possible to add a milling operation which, guided by the process parameters adjusts the length of the panels.

It is advantageous to use a vision system for input to the guiding of the process. Such a system advantageously incorporates ccd cameras. It is also possible to use simpler systems like photo cells and light beams, or even mechanical systems for locating edges, holes, protrusions or the like used for identifying and positioning the different substrates of the laminate. It is also advantageous to use several measuring points on each substrate to be guided in order to achieve the best match possible. Traditionally one uses one or possibly two adjacent edges for positioning. Since the substrates of the invention are subject to change in format due to handling, moisture content etc. it is advantageous to use identification points on all four edges and by calculation achieve a middle fix point which is used for the matching. This procedure will ensure the best possible matching over the whole surface of the laminate. Also any sliding between the substrates during the lamination procedure will be measured by the post-lamination measuring system. These measurements will be used as a parameter when guiding the positioning. This will reduce any possible mismatch between decor and structure to a minimum. However, the best match will still be found along the centre line of the laminate. It is therefore advantageous to arrange structure pattern sections and decor section which have the greatest need for perfect match as close as possible to this centre line.

According to yet another embodiment of the invention a structure web is cut into sheets which are accurately arranged on top of the decor sheets and possible wear layer. It will hereby be possible to achieve a structure which in essential will match the decor of the decor sheet. Accordingly, the lamination takes place in the continuous laminate press wherein a structure web is cut into sheets, the cut being arranged on a fixed position related to possible repetition frequency of a structure pattern of the web. The achieved structure sheet is then arranged as an uppermost layer on top of the decor web and possible wear layers whereupon the base layers, the decor sheets and possibly the optional wear layer is laminated together under heat and pressure in the laminate press. The structure sheet is according to this embodiment of the invention removed from the achieved laminate after the press procedure.

As described earlier the present invention it is advantageous to precondition the different layers of the laminate before the lamination procedure.

The pressure in the continuous press is suitably in the range 5–90 Bar, preferably 15–70 Bar, while the temperature is in the range 140–200° C., preferably 160–180° C.

In order to achieve a more abrasion resistant laminate at least one of the layers, preferably the uppermost one is coated with hard particles, for example silica, aluminium oxide and/or silicon carbide with an average size of 1–150 µm, preferably around 10–90 µm.

The continuous wear layer is cut by means of a cutting device after the lamination procedure at a position between two adjacent base layer sheets. The cutting device is preferably guided by means of an ultrasonic sensor, identifying the gap between two adjacent base sheets. After having cut the continuous laminate into sheets it is advantageous to cut at least one longitudinal edge to form a reference edge before cutting the sheets into boards. At least the reference cut is preferably guided by means on a reference printed on the decor sheet.

What is claimed is:

1. A process for the manufacture of decorative boards, each of said boards includes a decorative layer, wherein a decor sheet is placed as a surface layer on a base layer and bonded thereto by pressing under elevated temperature and pressure wherein;
    a) the decor sheet is cut to a predetermined format from a web, the cut being arranged on a fixed position related to possible repetition frequency of a decor pattern of the web whereupon,
    b) the decor sheet is accurately placed on a base layer selected from the group consisting of particle board, MDF and HDF, the base layer being preconditioned to a predetermined moisture content and temperature prior to being contacted by the decor sheet; whereupon,
    c) the decor sheet is fixed to the base layer whereupon,
    d) a number of base layers with attached decor sheets are, one after the other, fed in between the belts of a continuous laminate press, together with an uppermost wear layer, such that the base layers, the decor sheets and the wear layer are laminated together under heat and pressure in the laminate press to form a laminate wherein:
    the continuous wear layer is cut by means of a cutting device after the lamination procedure at a position between two adjacent base layer sheets;
    the cutting device is guided by means of an ultrasonic sensor, identifying a gap between two adjacent base sheets;
    at least one longitudinal edge is cut to form a reference edge of the laminate;
    the decorative boards further comprise a wear layer which is constituted by at least one web of cellulose impregnated with melamine formaldehyde resin and provided with small aluminium oxide particles which wear layer web is continuously fed from a roll in between the belts of the continuous laminate press together with the base layer sheets and decor sheets and
    the longitudinal edge cut is guided by means on a reference printed on the decor sheet.

2. A process according to claim 1, wherein the base layer is constituted of a particle board with a thickness in the range 3–20 mm.

3. A process according to claim 1, wherein the base layer is constituted of a medium density fibre board with a thickness in the range 3–20 mm.

4. A process according to claim 1, wherein the base layer is constituted of a high density fibre board with a thickness in the range 3–20 mm.

5. A process according to claim 3, wherein the base layer consists of particle board.

6. A process according to claim 1, wherein the base layer consists of MDF.

7. A process according to claim 1, wherein the decor sheet is impregnated with an acidic catalyzed melamine formaldehyde resin.

8. A process according to claim 1, wherein the wear layer is impregnated with an acidic catalyzed melamine formaldehyde resin.

9. A process according to claim 1, wherein the decor sheet is constituted of cellulose impregnated with melamine formaldehyde resin.

10. A process according to claim 1, wherein a lowermost backing layer is continuously fed from a roll in between the belts of the continuous laminate press together with the base layer sheets and decor sheets.

11. A process according to claim 9, wherein the decor sheet is stretched to compensate for shrinking during the lamination procedure.

12. A process according to claim 10, wherein the base layer consists of a HDF.

13. A process according to claim 1, wherein the decor sheet has positioning means, said positioning means being placed in a predetermined relation to the direction variations of the decor pattern.

14. A process according to claim 1, wherein the decor sheet is preconditioned to a predetermined moisture content prior to being applied on the base layer.

15. A process according to claim 1, wherein the decor sheet is preconditioned to a predetermined temperature prior to being applied on the base layer.

16. A process according to claim 1, wherein the wear layer web is preconditioned to a predetermined moisture content prior to being applied on the decor sheet.

17. A process according to claim 1, wherein the wear layer web is preconditioned to a predetermined temperature prior to being applied on the decor sheet.

18. A process according to claim 1, wherein at least one balance layer is applied on the lower side of the base layer.

19. A process according to claim 18, wherein the balance layer web is preconditioned to a predetermined moisture content prior to being applied on the base layer.

20. A process according to claim 18, wherein the balance layer web is preconditioned to a predetermined temperature prior to being applied on the base layer.

21. A process according to claim 1, wherein the decorative layer is provided with a surface structure after the lamination procedure.

22. A process according to claim 21, wherein the surface structure is achieved by means of at least one structured embossing roller.

23. A process according to claim 21, wherein the temperature of the decorative boards is higher than 50° C. during the structuring procedure.

24. A process according to claim 21, wherein the decor is provided with positioning means selected from the group consisting of colour dots, holes, code lines and indentations, and that said positioning means are placed in a predetermined relation to the decor of the decor sheets.

25. A process according to claim 24, wherein the positioning means are used for guiding the positioning of at least one structured embossing roller.

26. A process according to claim 1, wherein the lamination takes place in the continuous laminate press wherein a structure foil is continuously fed through the press.

27. A process according to claim 1, wherein the lamination takes place in the continuous laminate press wherein a structure web is cut into sheets, the cut being arranged on a fixed position related to possible repetition frequency of a structure pattern of the web, the achieved structure sheet being arranged as an uppermost layer on top of the decor web and wear layers whereupon the base layers, the decor sheets and wear layer are laminated together under heat and pressure in the laminate press.

28. A process according to claim 26, wherein the structure sheet is removed from the achieved laminate after the press procedure.

29. A process according to claim 26, wherein the decor is provided with positioning means selected from the group consisting of colour dots, holes, code lines and indentations, and that said positioning means are placed in a predetermined relation to the decor of the decor sheets.

30. A process according to claim 1, wherein the pressure in the continuous press is 5–90 Bar and that the temperature is 140–200° C.

31. A process according to claim 26, wherein velocity of the structure foil is continuously guided by means of sensors and the positioning means so that an accurate match between the decor and the surface structure is obtained.

32. A process according to claim 31, wherein the sensors are selected from the group consisting of mechanical transmitters, scanners, photocells, ccd cameras and pneumatic sensors.

33. A process according to claim 1, wherein at least one of the layers is provided with hard particles, for example, silica, aluminium oxide and/or silicon carbide with an average size of 1–150 µm.

34. A process according to claim 1, wherein the pressure in the continuous press is 15–70 Bar and that the temperature is 160–180° C.

35. A process according to claim 1, wherein the uppermost layer is provided with hard particles, for example, silica, aluminium oxide and/or silicon carbide with an average size of 10–90 µm.

* * * * *